(12) United States Patent
Ball et al.

(10) Patent No.: US 11,702,842 B2
(45) Date of Patent: *Jul. 18, 2023

(54) ROOFTOP EQUIPMENT SUPPORT AND METHOD OF MANUFACTURE

(71) Applicant: WCM Industries, Inc., Colorado Springs, CO (US)

(72) Inventors: William T. Ball, Colorado Springs, CO (US); Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/319,877

(22) Filed: May 13, 2021

(65) Prior Publication Data

US 2021/0262234 A1    Aug. 26, 2021

Related U.S. Application Data

(63) Continuation of application No. 17/097,598, filed on Nov. 13, 2020, now Pat. No. 11,572,694.

(60) Provisional application No. 63/018,008, filed on Apr. 30, 2020, provisional application No. 62/935,423, filed on Nov. 14, 2019.

(51) Int. Cl.
*E04D 13/00* (2006.01)
*F16L 3/22* (2006.01)
*F16L 3/08* (2006.01)

(52) U.S. Cl.
CPC .............. *E04D 13/00* (2013.01); *F16L 3/085* (2013.01); *F16L 3/22* (2013.01)

(58) Field of Classification Search
CPC ......... F16M 13/02; E04D 13/00; F16L 3/085; F16L 3/22; F16L 3/222; F16L 3/223; F16L 3/243; F16L 3/26
USPC ... 52/507.07, 650.1, 677, 710, 839, 840, 39, 52/220.2
See application file for complete search history.

(56) References Cited

U.S. PATENT DOCUMENTS 1,007,511 A * 10/1911 Young .................. E04B 1/4107
246/415 R
1,343,279 A    6/1920 Reynolds
(Continued)

FOREIGN PATENT DOCUMENTS

GB          2206619 A  *  1/1989  ............. E04C 5/168

OTHER PUBLICATIONS

Big Foot Systems, "Rooftop Building Services Support Systems" Catalog, Mar. 2018, 18 pgs.
(Continued)

*Primary Examiner* — Kimberly T Wood

(57) ABSTRACT

A roof equipment support includes a platform, a pair of sidewalls extending from the platform, and a top wall extending between the pair of sidewalls and offset from the platform. The platform, the pair of sidewalls, and the top wall define an interior cavity that extends a length of the support from a first end to a second end. A pair of strut extensions extend above the top wall, and each of the pair of strut extension include a hook at a distal end. The pair of strut extensions and the top wall define a substantially U-shaped channel that extends at least a portion of the length of the support, and the platform, the pair of sidewalls, the top wall, and the pair of strut extensions are unitarily formed.

12 Claims, 12 Drawing Sheets

(56) References Cited

U.S. PATENT DOCUMENTS

| | | | |
|---|---|---|---|
| 1,435,785 A | 11/1922 | Alexander | |
| 1,476,473 A | 12/1923 | Skinner | |
| 1,541,129 A | 6/1925 | Farley | |
| 1,831,306 A | 11/1931 | Kakimoto | |
| 2,103,811 A | 12/1937 | Davis | |
| 2,384,369 A | 9/1945 | D'Alelio | |
| 2,461,394 A | 2/1949 | Plante | |
| 2,480,412 A | 8/1949 | King | |
| 2,606,952 A | 8/1952 | Cofer | |
| 3,016,219 A | 1/1962 | Murphy | |
| 3,398,933 A | 8/1968 | Haroldson | |
| 3,471,987 A * | 10/1969 | Yelsma | F16L 3/13 52/684 |
| 3,687,406 A | 8/1972 | Krahe | |
| 3,769,190 A | 10/1973 | Deem, Jr. | |
| 3,809,348 A | 5/1974 | Di Laura | |
| 4,386,870 A | 6/1983 | Baroody | |
| 4,445,656 A | 5/1984 | Leitch | |
| 4,502,653 A | 3/1985 | Curtis, Jr. | |
| 5,110,073 A | 5/1992 | Schoenky | |
| 5,358,209 A | 10/1994 | Ward | |
| 5,435,411 A | 7/1995 | Borgatti | |
| 5,437,424 A | 8/1995 | Netz, Sr. | |
| 5,718,344 A | 2/1998 | Joldeson | |
| 5,785,457 A | 7/1998 | Thompson | |
| 5,855,342 A * | 1/1999 | Hawkins | F16L 3/243 248/68.1 |
| 5,906,341 A | 5/1999 | Brown | |
| 6,206,613 B1 | 3/2001 | Elkins | |
| 6,227,752 B1 | 5/2001 | Friedrich | |
| 6,332,595 B1 | 12/2001 | Klucznik | |
| 6,345,474 B1 * | 2/2002 | Triplett | E02D 27/01 405/229 |
| 6,405,981 B1 | 6/2002 | Hung-Jang | |
| 6,679,461 B1 * | 1/2004 | Hawkins | F16L 3/00 248/74.2 |
| 6,682,025 B2 * | 1/2004 | Turner | F16L 3/1041 248/49 |
| 6,684,594 B1 * | 2/2004 | Sorkin | E04C 5/20 52/685 |
| 7,000,787 B2 | 2/2006 | Felsenthal | |
| 7,322,158 B1 * | 1/2008 | Sorkin | E04C 5/168 52/685 |
| 7,621,486 B1 | 11/2009 | Barrepski | |
| 7,673,917 B2 | 3/2010 | Oliason | |
| 8,033,024 B2 | 10/2011 | Goop | |
| 8,052,098 B1 | 11/2011 | Kowaleski | |
| 8,052,110 B2 | 11/2011 | Wang | |
| 8,181,916 B2 * | 5/2012 | Azuma | F16L 3/127 248/68.1 |
| 8,348,317 B1 | 1/2013 | Bird | |
| 8,356,778 B2 * | 1/2013 | Birli | F16L 3/243 248/73 |
| 8,540,194 B2 * | 9/2013 | Azuma | F16L 3/243 248/68.1 |
| 9,431,802 B2 * | 8/2016 | Anselmo | H02G 3/0437 |
| 9,556,582 B2 * | 1/2017 | Pelletier | E02D 27/01 |
| 9,631,355 B1 | 4/2017 | Taraszkiewicz | |
| 9,726,303 B1 * | 8/2017 | Gretz | B23P 11/00 |
| D810,008 S * | 2/2018 | Mollison | D13/102 |
| 10,077,893 B1 | 9/2018 | Abraham | |
| 10,746,323 B2 | 8/2020 | Ball | |
| 10,774,951 B2 | 9/2020 | Ball | |
| 2001/0009087 A1 | 7/2001 | Valentz | |
| 2002/0011548 A1 | 1/2002 | Parker | |
| 2004/0031228 A1 * | 2/2004 | Hardy, Jr. | E04C 5/205 404/136 |
| 2005/0097836 A1 * | 5/2005 | Krovats | F16L 3/243 52/198 |
| 2006/0091265 A1 * | 5/2006 | Smart | F16L 3/02 248/49 |
| 2007/0022676 A1 * | 2/2007 | Krovats | F16L 55/035 52/167.9 |
| 2008/0054143 A1 * | 3/2008 | Collins | F16L 3/26 248/227.2 |
| 2009/0272856 A1 * | 11/2009 | Azuma | F16L 3/04 248/49 |
| 2012/0025034 A1 * | 2/2012 | Turner | F16L 3/04 248/65 |
| 2013/0214101 A1 | 8/2013 | Daniel | |
| 2014/0020224 A1 * | 1/2014 | Heims | H02G 3/32 29/428 |
| 2014/0197282 A1 * | 7/2014 | Turner | F16L 3/20 248/49 |
| 2014/0332641 A1 * | 11/2014 | Wilson | F16L 3/04 248/71 |
| 2015/0048222 A1 | 2/2015 | Eley | |
| 2016/0131280 A1 | 5/2016 | Brown | |
| 2016/0298794 A1 | 10/2016 | Costa | |
| 2019/0145547 A1 | 5/2019 | Ball | |
| 2019/0145548 A1 | 5/2019 | Ball | |
| 2020/0355301 A1 | 11/2020 | Ball | |
| 2021/0148118 A1 | 5/2021 | Ball | |

OTHER PUBLICATIONS

Eaton, "DURA-BLOK B-Line Series—A Complete Rooftop Support Solution", Jun. 2018, 8 pgs.
Haydon, "H-Block Rooftop Support Systems" Catalog, Jan. 2016, 28 pgs.
MIFAB C-Port, "C-Port Rubber Supports List Price Guide", 2012, 20 pgs.
Miro Industries, Inc., "Rooftop Support Products", www.miroind.com/products/, downloaded Aug. 2019, known as of Oct. 2017, 4 pgs.
OMG Roofing products, "Pipe Supports and Flashings", www.omgroofing.com/pipe-supports.html?language=en, 2016, 1 pg.
PHP Systems/Designs, "Product Spotlight: Equipment & Solar Supports, Duct & Cable Trays" Product Flyer, downloaded Aug. 2019, known as of Oct. 2017, 4 pgs.
Pipe Prop, "Adjustable Rooftop Pipe Support System" Brochure, Oct. 2017, 2 pgs.
PortalsPlus, "Pipe Mountings Pedestals", www.portalsplus.com, Oct. 2017, 1 pg.
Roof Top Blox, "Adjustable Piping Support" Catalog, Sep. 2013, 2 pgs.
U.S. Appl. No. 16/191,215, Office Action dated Jan. 7, 2020, 9 pages.
U.S. Appl. No. 16/191,233, Office Action dated Oct. 22, 2019, 14 pages.
U.S. Appl. No. 16/191,233, Office Action dated Mar. 20, 2020, 12 pages.
U.S. Appl. No. 16/191,215, Notice of Allowance dated Apr. 15, 2020, 11 pages.
U.S. Appl. No. 16/191,233, Notice of Allowance dated May 13, 2020, 11 pages.
U.S. Appl. No. 16/863,849, Office Action dated Apr. 7, 2021, 17 pages.
U.S. Appl. No. 16/863,849, Office Action dated Jul. 22, 2021, 20 pages.

* cited by examiner

ROOFTOP EQUIPMENT SUPPORT AND METHOD OF MANUFACTURE

CROSS-REFERENCE TO RELATED APPLICATIONS

This application is a continuation of U.S. application Ser. No. 17/097,598, filed Nov. 13, 2020, which claims priority to and the benefit of U.S. Provisional Application No. 62/935,423, filed Nov. 14, 2019 and U.S. Provisional Application No. 63/018,008, filed Apr. 30, 2020, the disclosures of which are hereby incorporated by reference herein in their entireties.

INTRODUCTION

Service piping may be installed in horizontal or substantially horizontal orientations along roofs, floors, and other indoor or outdoor surfaces. Such piping may include hot water (or steam) and chilled water piping for heating and cooling applications, respectively. Other service piping may include domestic hot water and cold water, storm drainage, or sewer piping. Additionally, specialty piping such as chemical and/or gas piping for industrial processes may be installed, or electrical and/or communication conduits for fibers, wires, and cables may be installed. Furthermore, access ramps, maintenance platforms, and mechanical units may also be installed on roofs, floors, and other indoor or outdoor surfaces. Typically, all of these types of piping and equipment are installed above the surface along which they are routed to maintain required clearances, accommodate thermal expansion and contraction, and to increase visibility thereof to avoid damage.

SUMMARY

In an aspect, the technology relates to a roof equipment support including: a platform; a pair of sidewalls extending from the platform; a top wall extending between the pair of sidewalls and offset from the platform, wherein the platform, the pair of sidewalls, and the top wall define an interior cavity that extends a length of the support from a first end to a second end; and a pair of strut extensions extending above the top wall, wherein each of the pair of strut extension include a hook at a distal end, wherein the pair of strut extensions and the top wall define a substantially U-shaped channel that extends at least a portion of the length of the support, and wherein the platform, the pair of sidewalls, the top wall, and the pair of strut extensions are unitarily formed.

In an example, at least one support wall is disposed within the interior cavity, the at least one support wall at least partially defines at least one lumen that extends the length of the support. In another example, the at least one support wall extends between the pair of sidewalls and defines at least partially an upper lumen and a lower lumen of the at least one lumen. In yet another example, the at least one support wall includes a pair of support walls in a substantially V-shaped configuration. In still another example, the at least one support wall is configured to support a load, and the upper lumen is sized and shaped to receive a piping member that extends therethrough. In an example, a cross-sectional profile of the support is constant along the length of the support.

In another example, the platform, the pair of sidewalls, the top wall, and the pair of strut extensions are formed from the same material in an extrusion process. In yet another example, an angle between the platform and each of the pair of sidewalls within the interior cavity is an acute angle. In still another example, a width of the platform is greater than a spacing between the pair of sidewalls. In an example, the roof equipment support includes a roller element, the roller element includes a shaft insertable at least partially within the substantially U-shaped channel and rotatable therein, and a diameter of the shaft is greater than a height of the pair of strut extensions above the top wall.

In another aspect, the technology relates to a roof equipment support including: a monolithic body having a first end and an opposite second end defining a longitudinal axis, wherein the monolithic body includes: a platform; a top surface; a first side surface; a second side surface opposite the first side surface; and a pair of strut extensions extending upward from the top surface and each of the pair of strut extensions are disposed adjacent a respective side surface of the first and second side surfaces, wherein each of the pair of strut extensions have a hook at a distal end, and wherein a cross-sectional profile of the monolithic body is constant along the longitudinal axis.

In an example, the platform, the top surface, the first side surface, and the second side surface form a substantially trapezoidal cross-sectional profile. In another example, two or more lumens are defined in the monolithic body and extending from the first end to the second end along the longitudinal axis, the two or more lumens are disposed between the platform and the top surface, and between the first side surface and the second side surface, and the two or more lumens are separated by at least one support wall. In yet another example, the at least one support wall is configured to support a load and defines a pipe rest portion that is concave in shape. In still another example, each hook of the pair of strut extensions face each other. In an example, the roof equipment support further includes a roller element configured to be rotatably received at least partially between the top surface and the pair of strut extensions, the roller element includes an elongated shaft with a diameter that is greater than a height of the pair of strut extensions above the top surface. In another example, the roller element further includes a pair of end caps that are configured to couple to ends of the elongated shaft.

In another aspect, the technology relates to a method of manufacturing roof equipment supports including: preparing a material for extrusion; extruding the material through a die, wherein the extrusion forms an elongated support having a platform, a pair of sidewalls extending from the platform, and a top wall extending between the pair of sidewalls such that an interior cavity is formed, the elongated support also has a pair of strut extensions extending from the top wall such that a substantially U-shaped channel is formed opposite the interior cavity relative to the top wall; and cutting the elongated support to length and generating a plurality of roof equipment supports having a same cross-sectional profile.

In an example, a first roof equipment support of the plurality of roof equipment supports has a length that is different than a second roof equipment support of the plurality of roof equipment supports. In another example, the method further includes: cutting a plurality of elongated shafts to substantially match the cut length of the plurality of roof equipment supports, wherein the plurality of elongated shafts have a diameter that is greater than a height of the pair of strut extensions above the top wall; and forming a plurality of end caps each having an enlarged flange and a post extending therefrom, wherein the post is configured to be coupled to an end of the plurality of elongated shafts to form a roller element that is rotatably supported at least partially within the substantially U-shaped channel of the plurality of roof equipment supports.

BRIEF DESCRIPTION OF THE DRAWINGS

There are shown in the drawings examples that are presently preferred, it being understood, however, that the invention is not limited to the precise arrangements and configurations shown.

DETAILED DESCRIPTION

Figure 1:
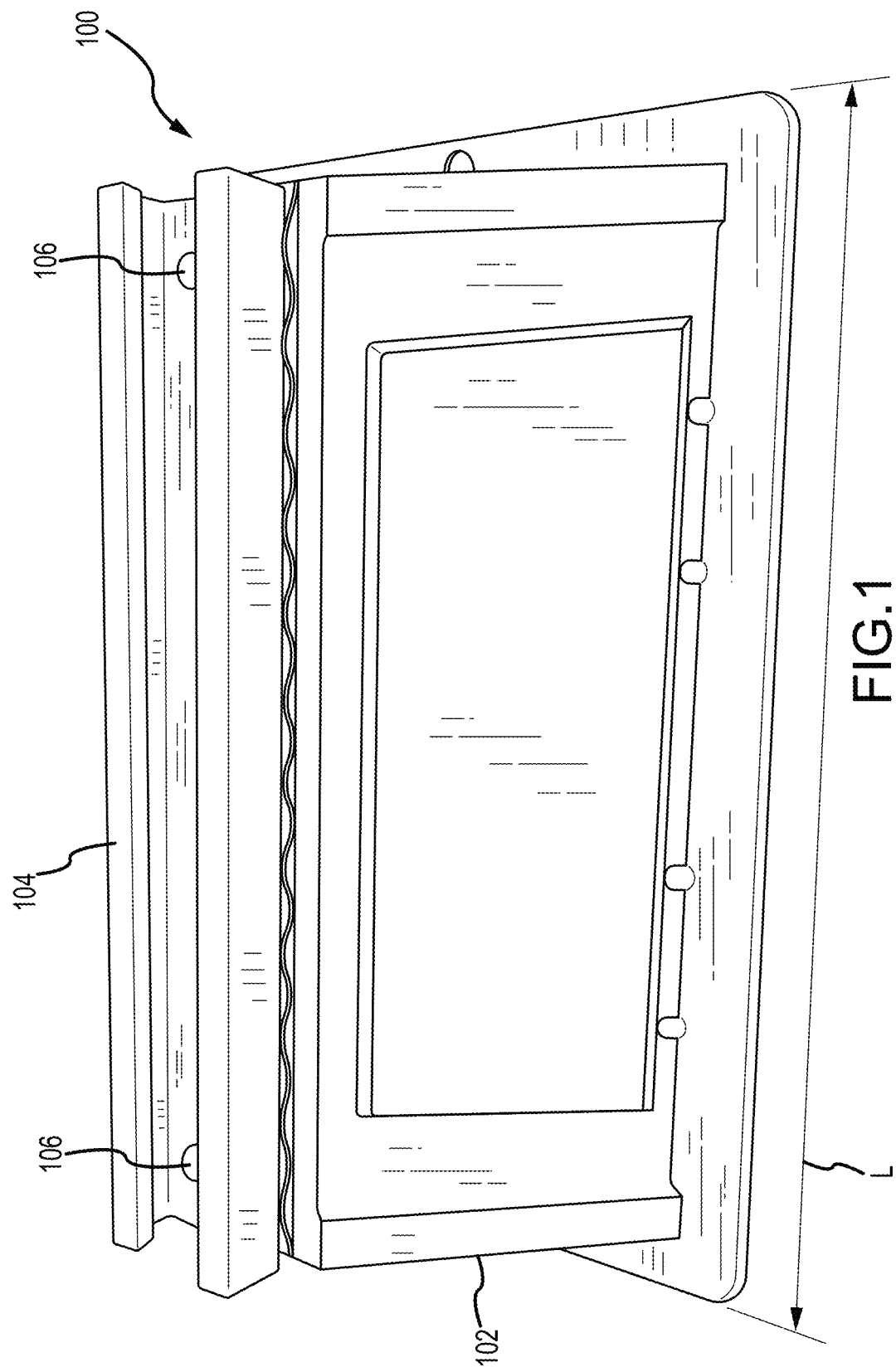
FIG. 1 is a perspective view of a prior art rooftop equipment support system.

FIG. 1 is a perspective view of a prior art rooftop equipment support system 100. The system 100 includes a base member 102 and a strut member 104. The base member 102 is positioned on an underlying surface such as a roof and is typically formed from a plastic- or rubber-based material in a block like shape via a molding process. The strut member 104 is coupled to the top of the base member 102 and is used to support the rooftop equipment, such as, piping and/or a portion of a platform or mechanical unit. The strut member 104 is usually formed from a metal sheet, folded over into an open channel shape with inwards-curving lips configured to receive interconnecting components. Additionally, the strut member 104 has holes of some sort in the base and to facilitate coupling the strut member 104 to other discrete components (e.g., the base member 102). The rooftop equipment can be secured to the strut member 104 by a strut securement element (not shown) that secures within the strut channel. The strut member 104 is typically formed from a different material than the base member 102, such as, a metal-based material. In the prior art example, the strut member 104 is removably coupled to the base member 102 by one or more bolt connectors 106. For example, a threaded bolt extends from the strut member 104 and through the top of the base member 102. A nut threads onto the bolt and is disposed within an interior cavity of the base member 102. In other examples, studs or screws can be used to attach the strut member 104 to the base member 102.

During installation of the prior art system 100, because the base member 102 and the strut member 104 are formed from different materials and processes, the installers are required to assemble the system 100 by coupling the strut member 104 to the base member 102. This requirement increases the installation costs of using the prior art system 100, often significantly because the system 100 is assembled on-site or assembled in a factory and shipped as an assembled component. Additionally, because the base member 102 is typically formed via a molding process, its length L is set so that shorter lengths L are not possible, and in order to get longer lengths L, two or more base members 102 are required to be placed next to one another with the strut member 104 spanning between. This configuration requires that the strut member 104 not only accommodate the strut securement element for the rooftop equipment, but also have adequate structural strength to resist shear and bending loads applied onto the strut member 104 by the equipment.

Furthermore, when the system 100 is used on roofs and other outdoor surfaces, exposure to the outdoor elements (e.g., sun, rain, etc.) degrades the base member 102 and the strut member 104 differently. This reduces performance of the system 100 and can result in the entire system 100 needing replacement, while only one component piece is degraded. For example, although plastic base members 102 are lightweight and inexpensive, plastic tends to deteriorate rapidly for a variety of reasons including heat, moisture, sunlight, and physical stresses that induce cracking, distortion, and/or other plastic degradation. In another example, rubber base members 102 are known to deteriorate and ripple when exposed to the elements. While metal strut members 104 can corrode. Accordingly, improvements to rooftop equipment support systems are desired.

Figure 2:
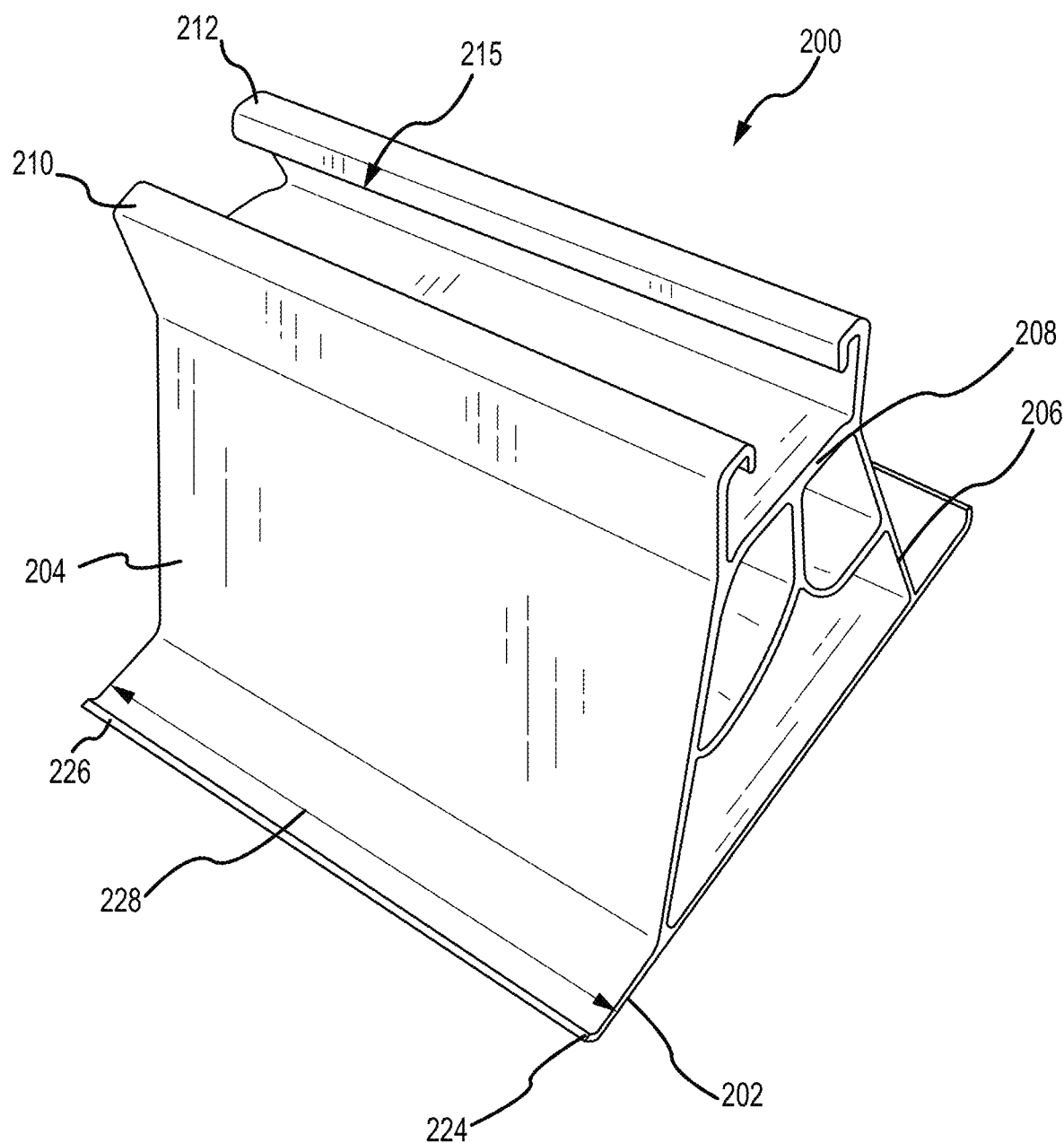
FIG. 2 is a perspective view of an exemplary rooftop equipment support.
Figure 3:
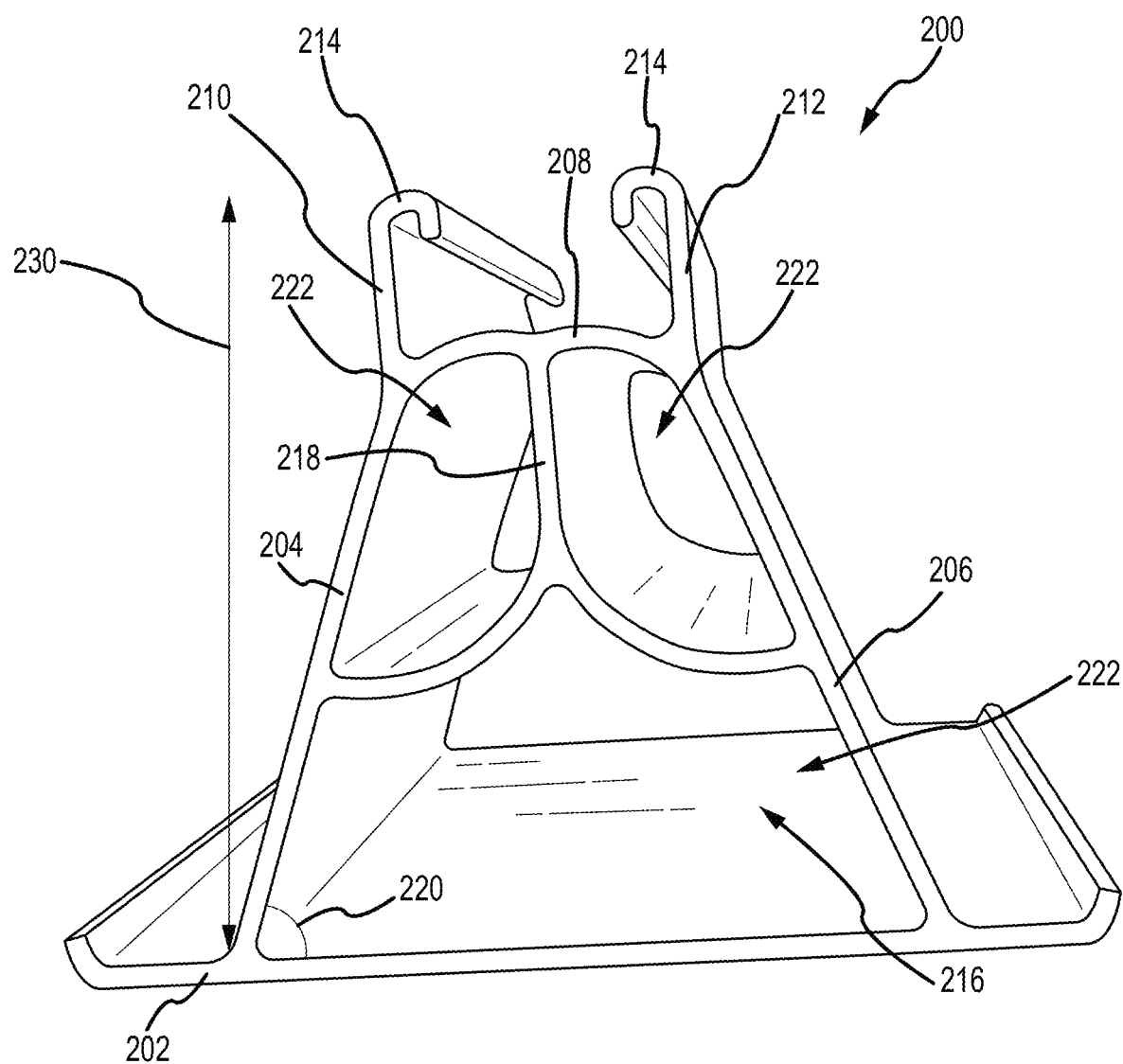
FIG. 3 is an end elevation view of the rooftop equipment support shown in FIG. 2.

FIG. 2 is a perspective view of an exemplary rooftop equipment support 200. FIG. 3 is an end elevation view of the rooftop equipment support 200. Referring concurrently to FIGS. 2 and 3, the support 200 includes a platform 202, a pair of opposing sidewalls 204, 206, and a top wall 208. The pair of opposing sidewalls 204, 206 extend from one side of the platform 202 and the top wall 208 extends between the pair of opposing sidewalls 204, 206 being offset from the platform 202. A pair of opposing strut extensions 210, 212 extend from a respective sidewall 204, 206 and above the top wall 208. In the example, the platform 202 is a solid plate and is configured to sit on top of the underlying surface, such as the roof. In alternative examples, the platform 202 may include one or more openings (not shown) that allow the support 200 to be secured to the underlying structure with screws, bolts, or other fasteners. In other examples, an underside of the platform 202 opposite of the sidewalls 204, 206 may be coated with an adhesive. In still other examples, the platform 202 may include one or more elastic pads on the underside bottom.

The sidewalls 204, 206 extend from the platform 202 and support the top wall 208 above the platform 202. The strut extensions 210, 212 extend above the top wall 208 and each of the strut extensions 210, 212 includes return hooks 214 at the distal ends. The strut extensions 210, 212 and the top wall 208 define a substantially U-shaped channel 215 formed as a strut member and used to support the rooftop equipment such as piping and/or a portion of a platform or mechanical unit. The rooftop equipment can be secured to the support 200 by a strut securement element (not shown) that engages with the return hooks 214 and within the U-shaped channel 215. Generally, the strut channel is used to mount, brace, support, and connect structural loads in building construction. Equipment can be attached to the strut channel with a bolt and channel nut (not shown). Round objects such a piping or cables can be attached with straps (not shown) that have a shaped end retained by the channel. Other attachment and securement systems that facilitate coupling equipment to the U-shaped channel 215 is also contemplated herein.

The size of the U-shaped channel 215 can be that of commonly known strut members. For example, 1⅝ inch by 1⅝ inch square width and height, with ⅜ inch return hooks 214 and an opening of ⅞ inch, a half-height of 1⅝ inch width and 13/16 inch height, or any other size as required or desired. Additionally or alternatively, the size of the U-shaped channel 215 can be customized and non-standard. In aspects, the strut extensions 210, 212 may be inwardly offset from the sidewalls 204, 206 on the top wall 208 to achieve the required or desired size of the U-shaped channel 215.

The platform 202, sidewalls 204, 206, and top wall 208 form an interior cavity 216 and are utilized to raise the strut extensions 210, 212 and U-shaped channel 215 above the platform 202. One or more support walls 218 may be disposed within the interior cavity 216 and extend between one or more of the platform 202, sidewalls 204, 206, and top wall 208. The support walls 218 are used to increase the structural strength of the support 200. As illustrated in FIGS. 2 and 3, the support walls 218 extend between the sidewalls 204, 206 and the top wall 208. In the example, the platform 202, sidewalls 204, 206, and top wall 208 form a base member and are positioned on an underlying surface, such as, the roof. In the example, the platform 202, sidewalls 204, 206, top wall 208, support walls 218, and strut extensions 210, 212 are all integral with one another.

In the example, the sidewalls 204, 206 may extend at an angle 220 from the platform 202 such that the interior cavity 216 has a substantially trapezoidal shape. As such, the angle 220 is an acute angle. The support walls 218 are disposed within the cavity 216 and form a plurality of lumens 222. By forming a plurality of lumens 222 through the support 200, the amount of material used to form the support 200 is reduced and the weight of the support 200 is reduced. This enables the support 200 to be cost efficient during manufacturing and shipping, while also maintaining its structural strength during use. In the example, two lumens 222 are formed proximate the top wall 208 via the support walls 218. It should be appreciated, that the sections of the support 200 can take any shape and/or size that enables the support 200 to function as described herein, and FIGS. 2 and 3 illustrate only one possible example.

In the example, the support 200 is a unitary component that is formed from an extrusion manufacturing process. As such, the support 200 has a fixed cross-sectional profile between ends 224, 226 that define a length 228 of the support. The features of the support 200 extend the full length 228 of the support 200 so that the cross-sectional profile is constant along the length 228. For example, the interior cavity 216 and the U-shaped channel 215 extend the length 228 of the support 200 from the first end 224 to the second end 226. In another example, the lumens 222 and the strut extensions 210, 212 extend the length 228 of the support 200 from the first end 224 to the second end 226.

Because the support 200 is unitary and an extruded component, the support 200 is formed from a single material, unlike the prior art system described above in reference to FIG. 1. This feature does not require on-site or factory assembly of two or more components, and as such, reduces installation costs. Furthermore, the support 200 wears from environmental considerations more evenly since it is formed from a single material and not a combination of materials. In an aspect, the platform 202, the sidewalls 204, 206, the top wall 208, the strut extensions 210, 212, and the one or more support walls 218 are unitarily formed from the same material and in an extrusion process. By "unitary," it is meant that the support is formed as a single or uniform entity and not assembled from a plurality of separate components. In the example, support 200 is formed from a metal-based material (e.g., aluminum, steel, and the like) and the extrusion process can be performed with the material hot or cold. By using a metal-based material, weather does not wear the support 200 as much as the prior art. It should be appreciated, that other materials (e.g., polymer, ceramics, etc.) can alternatively or additionally be used for the support 200 as required or desired. In still other examples, the support 200 can be additively manufactured (e.g., 3D printed) as required or desired to form the unitary support.

In the example, the support 200 is formed without joints or seams and is a monolithic body. By having the unitary support 200 without connection joints and surfaces, the structural strength of the support 200 is increased when compared to the prior art system illustrated in FIG. 1. Additionally, the unitary one-piece support 200 does not require any assembly during installation, thereby reducing the installation costs of the support 200 when compared to the prior art. Furthermore, by using an extruded manufacturing process, the length 228 between the ends 224, 226 of the support 200 can be cut to the required or desired size for use, unlike the prior art support as described above in FIG. 1. This further increases the performance and cost efficiencies of the support 200. Also, the U-shaped channel 215 is supported by the platform 202, sidewalls 204, 206, and support wall 218 along its entire length 228 (unlike extending a strut between two bases), such that its structural strength in resisting shear and bending forces increases.

In the example, the support 200 has a height 230 that is defined from the platform 202 to the top of the strut extension 210. In an aspect, the height 230 can be approximately 4-inches. In other examples, the height 230 can be shorter or greater than 4-inches as required or desired and by decreasing or increasing the cross-sectional profile size of the support 200. The shape and members of the support 200 allow for it to be scaled up or down easily so as to configure the height 230 without needing many, if any, other design changes.

Figure 4:
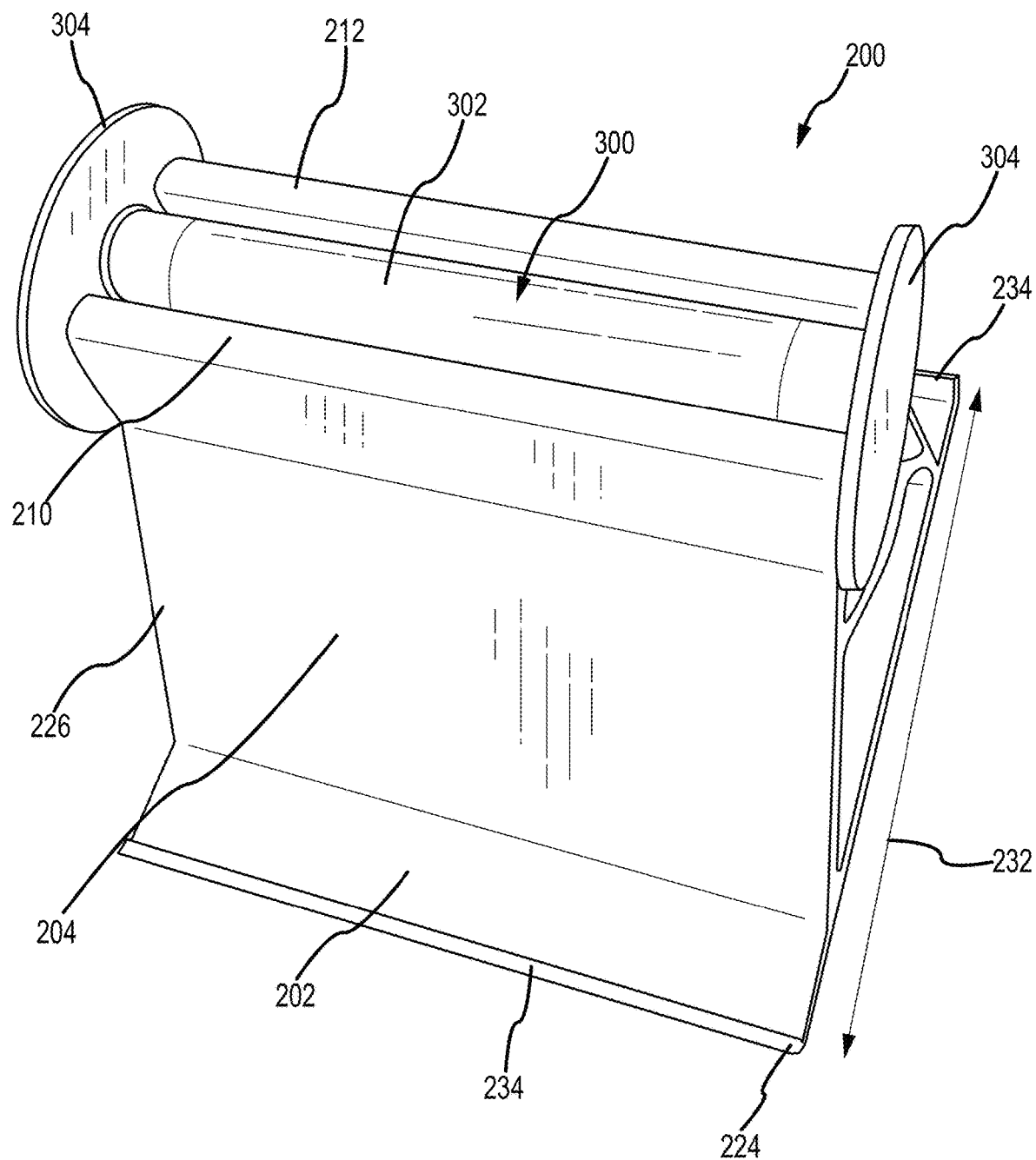
FIG. 4 is a perspective view of the rooftop equipment support shown in FIGS. 2 and 3 with a roller element.

FIG. 4 is a perspective view of the rooftop equipment support 200 with a roller element 300. Certain features of the support 200 are described above in reference to FIGS. 2 and 3, and thus, not necessarily described further below. In some examples, the roof equipment supported on the support 200, such as piping or cables, may require axial movement (e.g., due to thermal expansion) so as to decrease stress on the equipment. As such, the roller element 300 is configured to be rotatably supported on top of the support 200 and freely rotate relative thereto. The roller element 300 includes an elongated cylindrical shaft 302 that is supported within the U-shaped channel between the top wall 208 (shown in FIG. 3) and the strut extensions 210, 212. A length of the shaft 302 can be selectively cut to match the length 228 (shown in FIG. 2) of the support 200. The shaft 302 has a diameter that is greater than a height that the strut extensions 210, 212 extend above the top wall 208 so that the equipment can be supported directly on the roller element 300 and axial movement is enabled. As such, the spacing between the strut extensions 210, 212 is greater than the height that the extensions 210, 212 extend above the top wall 208. To prevent the shaft 302 from sliding out the ends 224, 226 of the support 200, the roller element 300 can include enlarged end flanges 304. In the example, the flanges 304 substantially cover the ends of the strut extensions 210, 212 and the top wall 208 so that the roller element 300 cannot slide out one of the ends 224, 226 of the support 200. Rather, the roller element 300 needs to be inserted and removed from the top of the support 200.

In the example, the platform 202 has a width 232 that extends substantially orthogonal to the length 228 of the support 200. The sidewalls 204, 206 are inwardly offset from the outermost edges of the platform 202 such that flanges 234 are defined on the platform 202. The flanges 234 are the portions of the platform 202 that extend out from the sidewalls 204, 206. The width 232 and the flanges 234 of the platform 202 allow for the support 200 to withstand greater overturning forces induced from the axial movement of the equipment supported therefrom.

Figure 5:
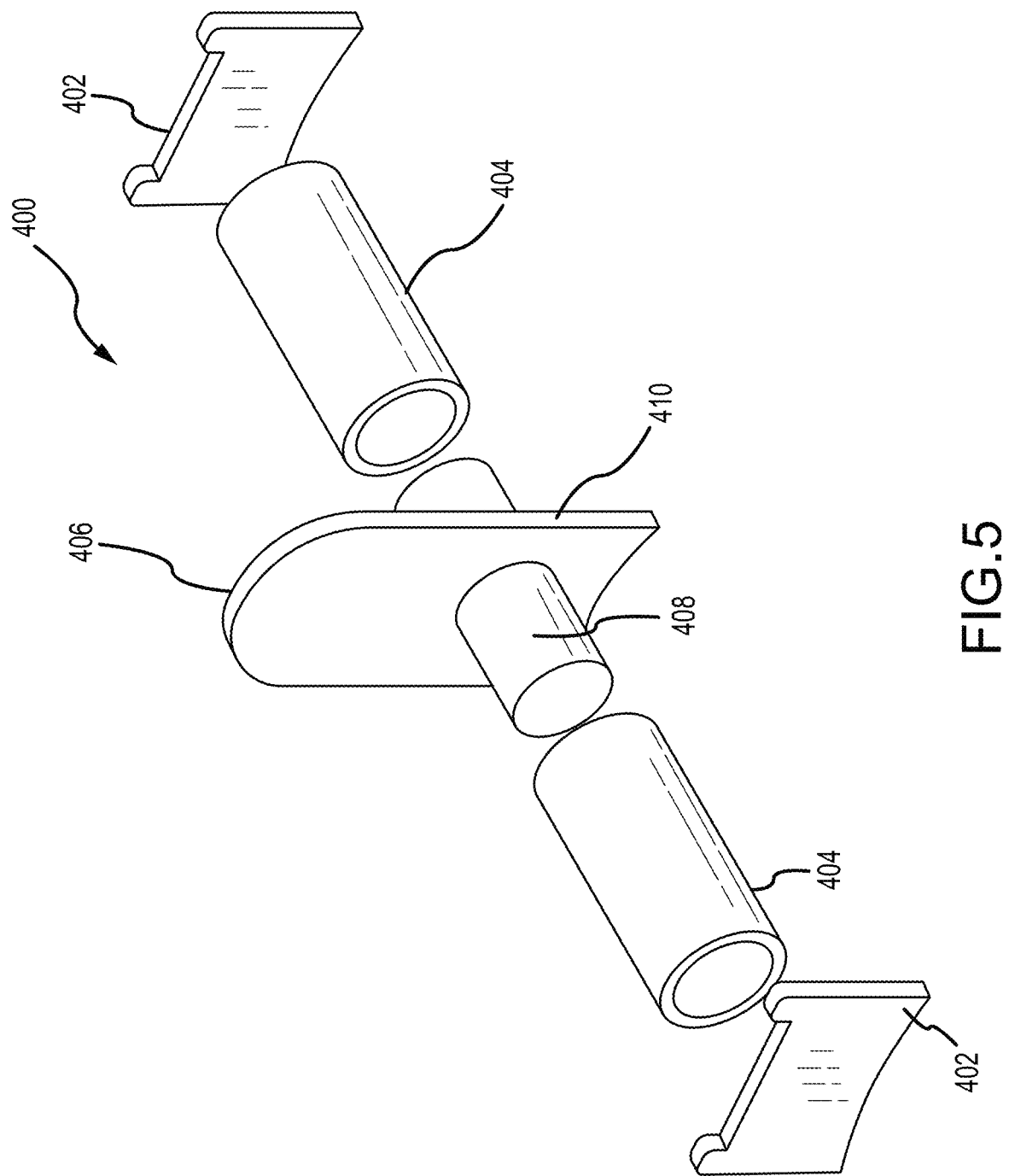
FIG. 5 is an exploded perspective view of another roller element that can be used with the rooftop equipment support shown in FIGS. 2 and 3.

FIG. 5 is an exploded perspective view of another roller element 400 that can be used with the rooftop equipment support 200 (shown in FIGS. 2 and 3). In this example, the roller element 400 includes a pair of caps 402 that are configured to couple to the ends of the support 200. For example, the caps 402 can couple to one or more of the extensions 210, 212 and/or the top wall 208 of the support (shown in FIGS. 2 and 3). One or more rotatable shafts 404 extend between the caps 402 and are disposed at least partially within the U-shape channel of the support 200 and rotatable relative thereto as described above. In one example, the shaft 404 can have open ends that are received by a post (not shown) extending from the cap 402 so as to retain the shaft 404 within the support and allow rotation thereof.

In this example, the shaft 404 can also be divided into two or more discrete portions separated by one or more spacers 406. These portions of the shaft 404 can be of similar or different lengths and enable two or more equipment members to independently move relative to each other and the support as required or desired. The spacers 406 can include a post 408 that is substantially rounded to receive a portion of the shaft 404. The spacers 406 can also include a divider 410 that can be snapped in-between the strut extensions 210, 212 to retain the spacer 406 and shaft portions 404 in place relative to the support 200. The divider 410 of the spacer 406 also allow for separating the two or more equipment members placed on the support 200. It should be appreciated that while two shafts 404 are illustrated in FIG. 5, the roller element 400 can include any other number of independent and discrete shafts as required or desired.

Figure 6:
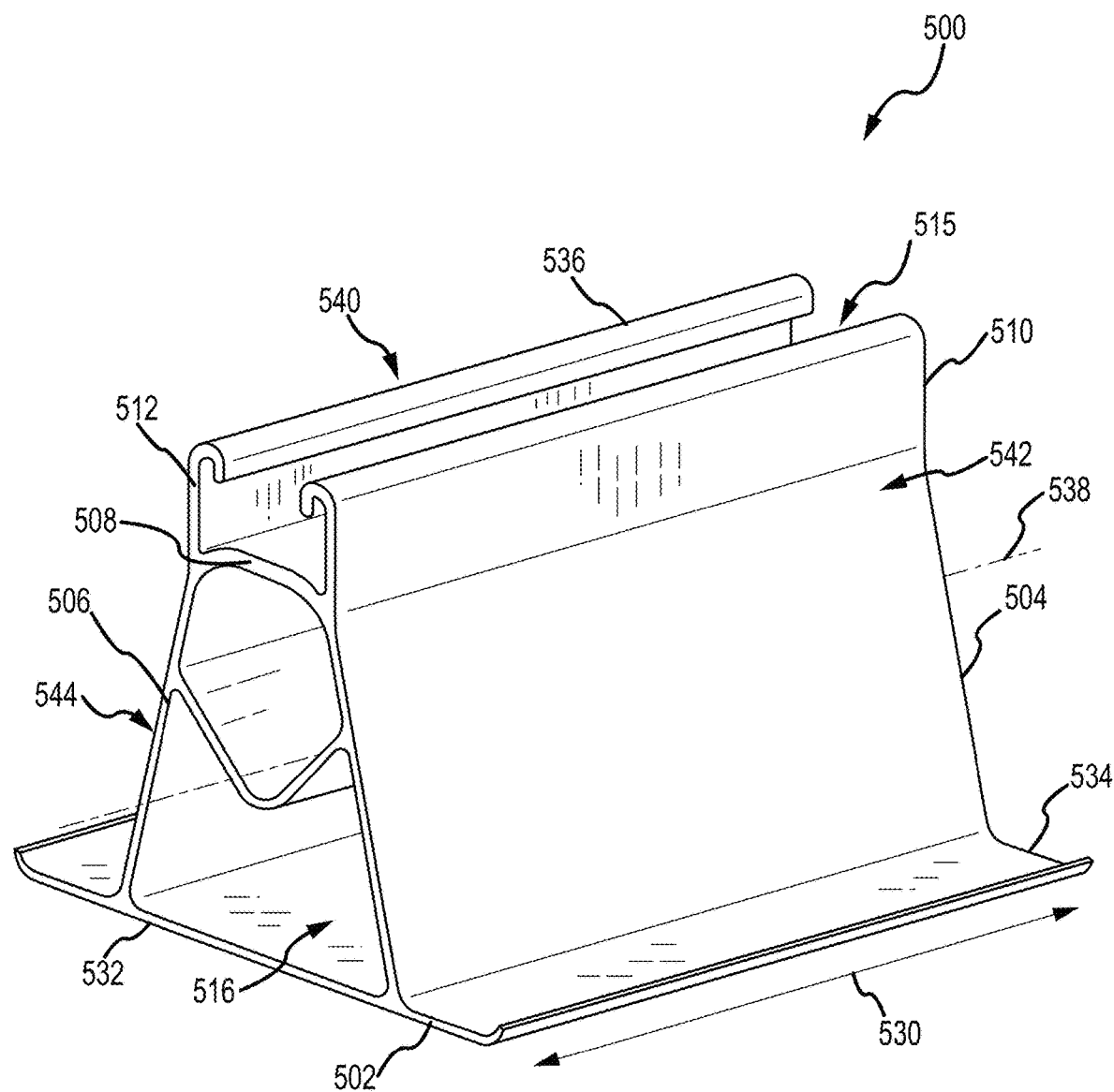
FIG. 6 is a perspective view of another rooftop equipment support.
Figure 7:
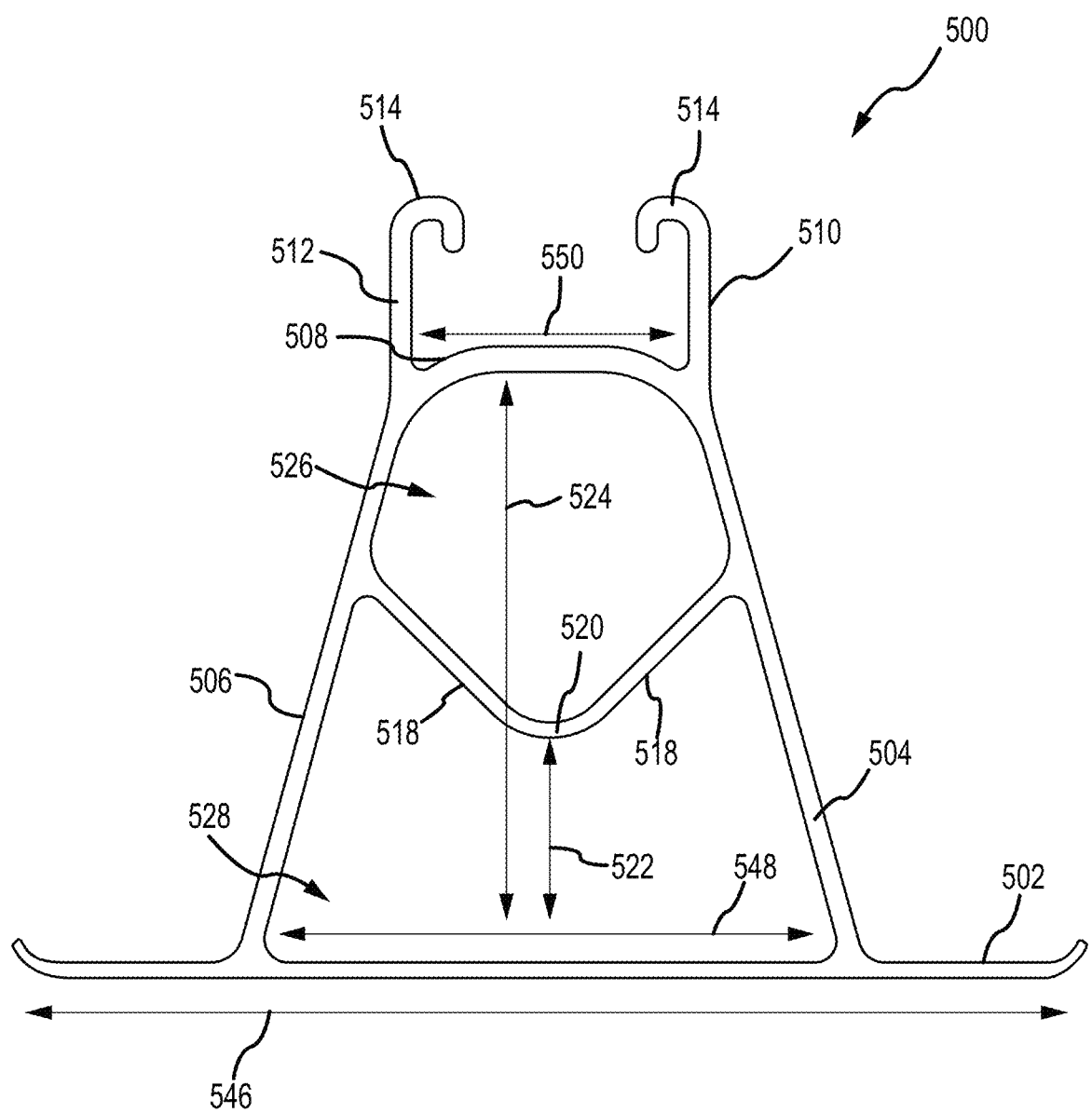
FIG. 7 is an end elevation view of the rooftop equipment support shown in FIG. 6.

FIG. 6 is a perspective view of another rooftop equipment support 500. FIG. 7 is an end elevation view of the rooftop equipment support 500. Referring concurrently to FIGS. 6 and 7, and similar to the support described above, the support 500 includes a platform 502, a pair of opposing sidewalls 504, 506, and a top wall 508. A pair of opposing strut extensions 510, 512 with return hooks 514 extend from a respective sidewall 504, 506 and above the top wall 508. The strut extensions 510, 512 and the top wall 508 form the U-shaped channel 515 corresponding to the strut member and used to support the rooftop equipment such as piping and/or a portion of a platform or mechanical unit. The platform 502, sidewalls 504, 506, and top wall 508 form an interior cavity 516 and are utilized to raise the strut extensions 510, 512 above the platform 502. One or more support walls 518 are disposed within the interior cavity 516 and extend between one or more of the platform 502, sidewalls 504, 506, and/or top wall 508. The support walls 518 are used to increase the structural strength of the support 500. Additionally, in this example, the support walls 518 are load bearing and are configured to support a load like roof equipment (e.g., piping) as required or desired. The cross-sectional shape of the support 500 enables the support to be manufactured by an extrusion-based process as described herein.

In the example, there are two support walls 518 in a substantially V-shaped configuration. The support walls 518 extend from the sidewalls 504, 506 within the interior cavity 516 at a location between the platform 502 and the top wall 508, and the support walls 518 are coupled together at a pipe rest portion 520. In the example, the pipe rest portion 520 is curved with concavity in an upwards direction, relative to the platform 502. In other examples, the pipe rest portion 520 may be formed from a planar and substantially parallel segment, relative to the platform 502, of the support walls 518. The pipe rest portion 520 is raised above the platform 502 at a height 522 that is less than a height 524 of the top wall 508. In an aspect, the height 522 of the pipe rest portion 520 may be about half of the height 524 of the top wall 508. In other aspects, the height 522 of the pipe rest portion 520 may be less than half of the height 524 of the top wall 508. In still other aspects, the height 522 of the pipe rest portion 520 may be greater than half of the height 524 of the top wall 508.

The support walls 518 divide the interior cavity 516 in two lumens, for example, an upper lumen 526 and a lower lumen 528. The upper lumen 526 is sized and shaped to receive piping and/or conduit such that the roof equipment is raised above the underlying surface. In an aspect, a cross-sectional area of the upper lumen 526 is less than a cross-sectional area of the lower lumen 528. In other aspects, the cross-sectional areas of the upper lumen 526 and the lower lumen 528 can be about equal. In still other aspects, the cross-sectional area of the upper lumen 526 is greater than the cross-sectional area of the lower lumen 528. By using two support walls 518, the amount of material used to form the support 500 is reduced and the weight of the support 500 is reduced. This enables the support 500 to be cost efficient during manufacturing and shipping, while also maintaining its structural strength and two different support locations during use.

In the example, the support 500 is a unitary component that is formed from an extrusion manufacturing process. As such, the support 500 has a fixed cross-sectional profile along its length 530 from a first end 532 to a second end 534 and is formed from a single material. The support 500 has a monolithic body 536 with a longitudinal axis 538 defined between the ends 532, 534. The body 536 includes the platform 502 that defines the bottom surface of the support 500. The body also includes a top surface 540 and a pair of opposing side surfaces 542, 544 that extends at least partially between the platform 502 and the top wall 508. The strut extensions 510, 512 extend upward from the top surface 540 and each of the strut extensions 510, 512 are disposed adjacent the respective side surface 542, 544. The hooks 514 face each other. The lumens 526, 528 are defined in the body 536 and extend along the longitudinal axis 538 from the first end 532 to the second end 534. The lumens 526, 528 are disposed between the platform 502 and the top surface 540, and between the side surfaces 542, 544. The cross-sectional profile of the support 500 as illustrated in FIG. 7 is constant along the longitudinal axis 538 and the entire length 530 of the body 536.

In the example, the platform 502, top surface 540, and side surfaces 542, 544 form a substantially trapezoidal cross-sectional profile. A width 546 of the platform 502 is greater than a spacing 548 between the sidewalls 504, 506 proximate the platform 502. Additionally, a width 550 of the top wall 508 is less than the spacing 548.

Figure 8:
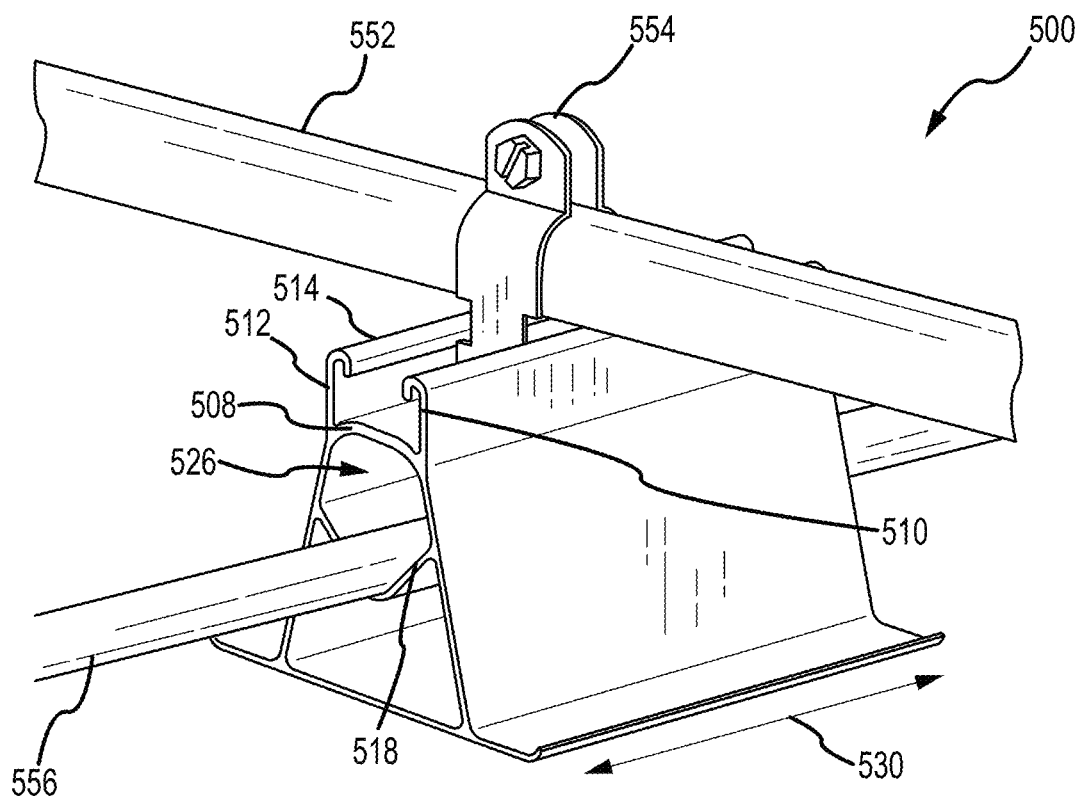
FIG. 8 is a perspective view of the rooftop equipment support shown in FIGS. 6 and 7 supporting piping in a first configuration.

FIG. 8 is a perspective view of the rooftop equipment support 500 supporting piping in a first configuration. As described above, the top wall 508, strut extensions 510, 512, and return hooks 514 form a U-shaped channel strut member that is used to support the rooftop equipment, such as piping and/or a portion of a platform or mechanical. As illustrated, a first piping member 552 can be supported on the U-shaped channel strut member and on top of the hooks 514 in a direction that is substantially orthogonal to the direction of the length 530 of the support 500. A strut securement element 554 is configured to engage with the strut member (e.g., slide within and underneath the hooks 514) so as to secure the first piping member 552 on top of the hooks 514.

A second piping member 556 can also be supported by the support 500. The second piping member 556 extends through the upper lumen 526 and is supported on the support walls 518. The second piping member 556 extends in a direction that is substantially parallel to the length 530 of the support 500 and substantially orthogonal to the first piping member 552. Because the support walls 518 are lower than the top of the hooks 514, the second piping member 556 is lower than and offset from the first piping member 552 so that each pipe can run in different and substantially orthogonal directions. It should be appreciated, that while two piping members 552, 556 are shown in FIG. 8, the support 500 can be utilized to support only the top piping member 552, or two or more top piping members, or only the bottom piping member 556, or two or more bottom piping members, as required or desired.

The upper lumen 526 is sized and shaped to receive the piping member 556 that extends therethrough. The support walls 518 are configured to support the load from the piping member 556. By "load bearing," it is meant that the support walls 518 are an active structural element of the support 500 and supports the weight of the equipment mounted above it.

Figure 9:
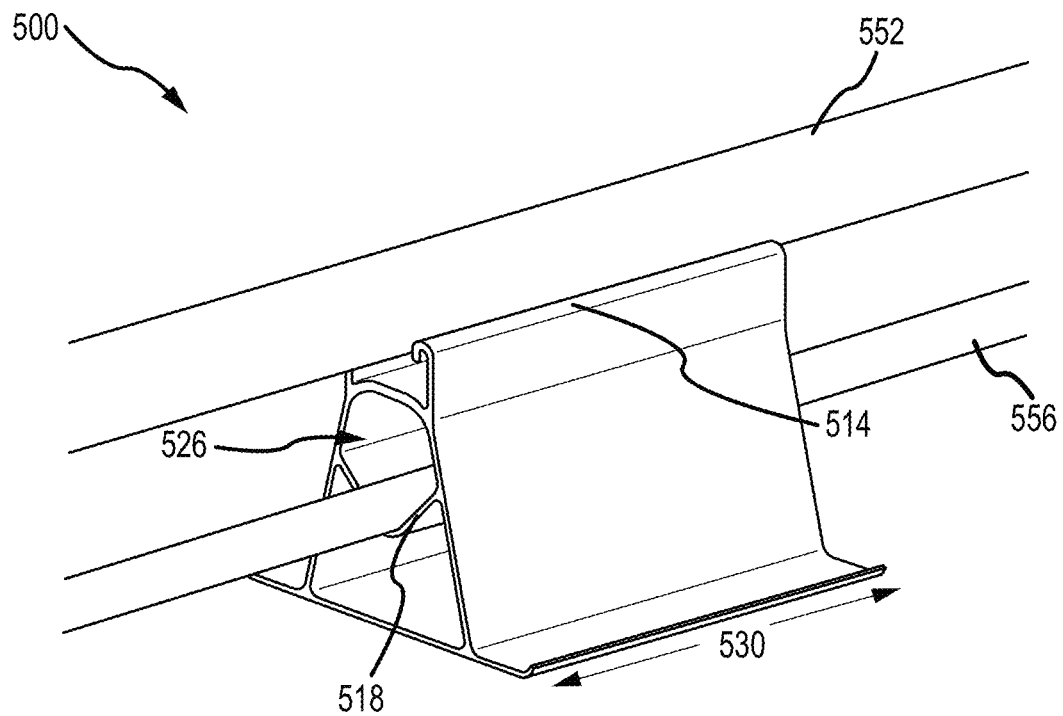
FIG. 9 is a perspective view of the rooftop equipment support shown in FIGS. 6 and 7 supporting piping in a second configuration.

FIG. 9 is a perspective view of the rooftop equipment support 500 supporting piping in a second configuration. As illustrated, the first piping member 552 is supported on the strut member and on top of the hooks 514 in a direction that is substantially parallel to the direction of the length 530 of the support 500. One or more straps (not shown) can be used to secure the first piping member 552 on top of the hooks 514 and the strut member. The second piping member 556 can also be supported by the support 500. The second piping member 556 extends through the upper lumen 526 and is supported on the support walls 518. The second piping member 556 extends in a direction that is also substantially parallel to the length 530 of the support 500, and thereby, substantially parallel to the first piping member 552. Because the support walls 518 are lower than the top of the hooks 514, the second piping member 556 is lower than and offset from the first piping member 552 so that each piping member can run substantially parallel to one another, but at different heights. It should be appreciated, that while two piping members 552, 556 are shown in FIG. 9, the support 500 can be utilized to support only the top pipe member 552 or only the bottom pipe member 556 as required or desired.

Figure 10:
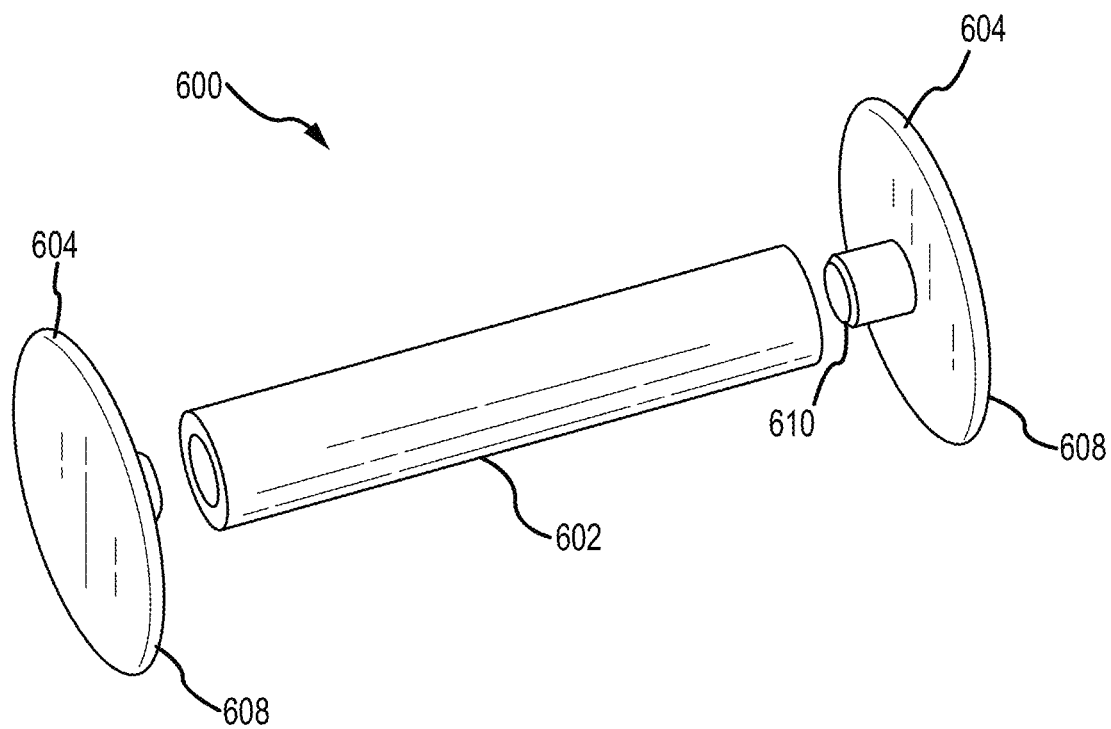
FIG. 10 is an exploded perspective view of another roller element that can be used with the rooftop equipment supports described herein.
Figure 11:
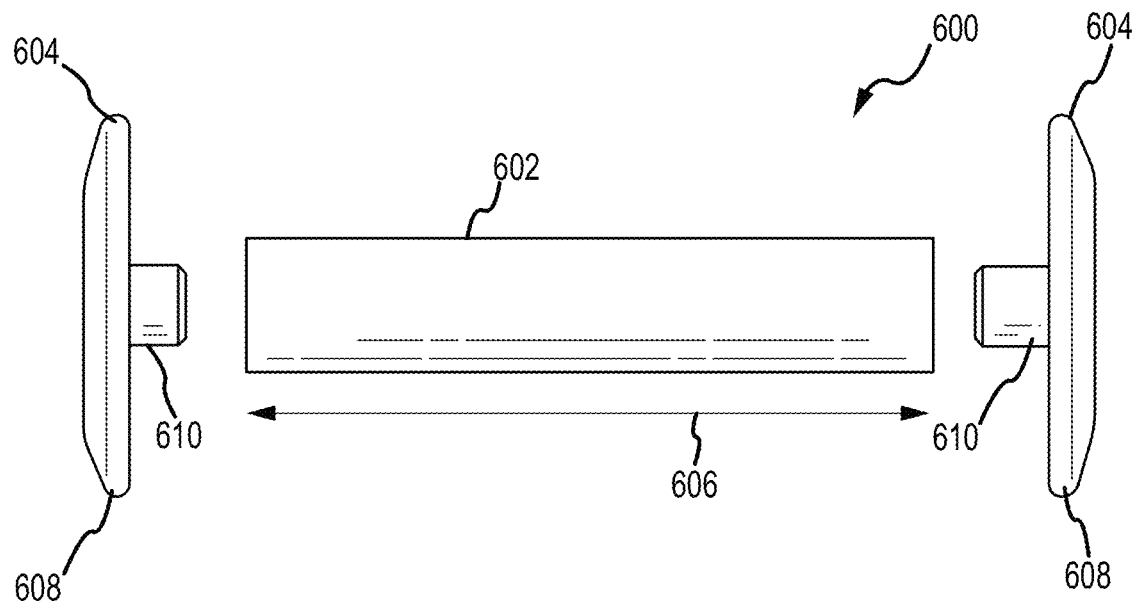
FIG. 11 is an exploded side view of the roller element shown in FIG. 10.

FIG. 10 is an exploded perspective view of another roller element 600 that can be used with the rooftop equipment supports described herein. FIG. 11 is an exploded side view of the roller element 600. Referring concurrently to FIGS. 10 and 11, and as described above, the roof equipment (e.g., piping) supported on the supports may require axial movement (e.g., due to thermal expansion) so as to decrease stress on the equipment. As such, the roller element 600 is configured to be rotatably supported on top of the supports at least partially within the U-shaped channel and freely rotate relative thereto. This enables for piping that is oriented substantially perpendicular to the length of the support to axially move as required or desired. An example, of a roller element supported on a support is illustrated in FIG. 4 and described above.

In the example, the roller element 600 includes an elongated cylindrical shaft 602 and enlarged end caps 604. The shaft 602 is substantially tubular and has a length 606. In other examples, the shaft 602 may take on any other shape as required or desired. The length 606 of the shaft 602 can be selectively cut to substantially match the length of the support. Additionally, the shaft 602 has a diameter that is greater than the height of the strut extensions of the support above the top wall so that at least a portion of the shaft 602 extends above the top of the support and the piping is directly supported on the shaft 602, not the hooks. The end caps 604 have an enlarged flange portion 608 and a post 610 extending therefrom. The post 610 is shaped and sized to be received at least partially within the ends of the shaft 602 so that the end caps 604 can be coupled to the shaft 602 and form the roller element 600. The flange portion 608 is configured to prevent the shaft 602 from sliding out of the ends of the supports. As illustrated in FIGS. 10 and 11, the roller element 600 is formed from two or more components (e.g., shaft 602 and end caps 604) coupled together. In other examples, the roller element can be formed as a unitary element with the shaft and enlarged flanges formed together as a single component. For example, the roller element 300 (shown in FIG. 4) may be a unitary component.

Figure 12:
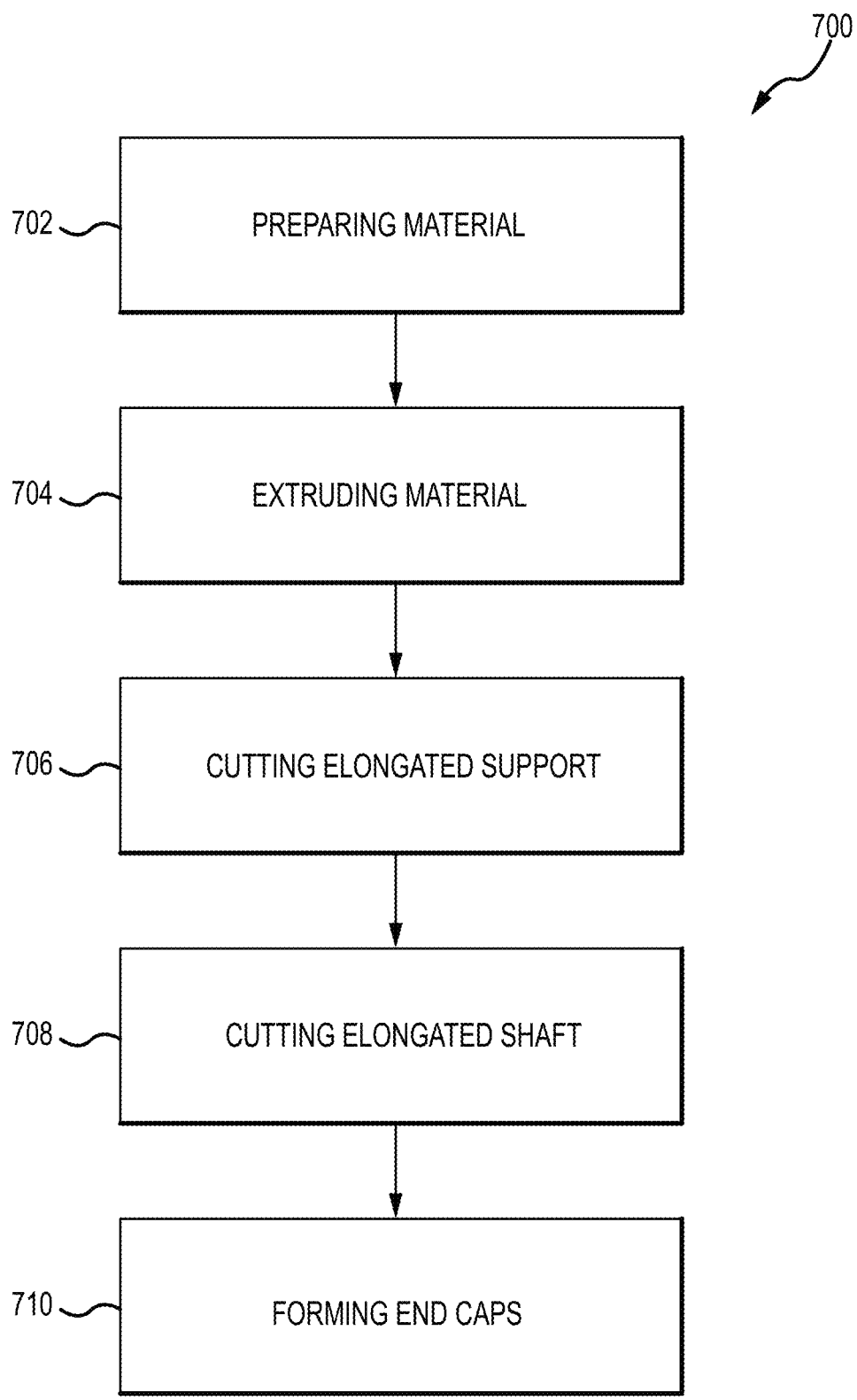
FIG. 12 is a flowchart illustrating an exemplary method of manufacturing roof equipment supports.

FIG. 12 is a flowchart illustrating an exemplary method 700 of manufacturing roof equipment supports, for example, the supports described above. The method 700 begins with preparing a material for extrusion (operation 702). In an aspect, the material can be a metal-based material like aluminum, steel, and the like. Other materials are also contemplated herein. The material is then extruded through a die (operation 704). In an example, the die is configured such that the extrusion forms an elongated support body having a platform, a pair of sidewalls extending from the platform, and a top wall extending between the pair of sidewalls such that an interior cavity is formed. The elongated support also has a pair of strut extensions extending from the top wall so that a substantially U-shaped channel is formed opposite of the interior cavity relative to the top wall. The elongated support formed is cut to length so that a plurality of roof equipment supports have the same cross-sectional profile (operation 706).

By forming the roof equipment support by extrusion, the body of the support is unitary and monolithic, thereby increasing its strength and life cycle. Additionally, the cut length of the support can be selected as required or desired without needing to change the cross-sectional profile of the body. For example, a first cut roof equipment support can have a length that is different than a second cut roof equipment support.

In an aspect, the method 700 can further include cutting a plurality of elongated shafts to substantially match the cut length of the plurality of roof equipment supports (operation 708). For example, the elongated shafts have a diameter that is greater than a height of the pair of strut extensions above the top wall. Additionally, a plurality of end caps are formed having an enlarged flange and a post extending therefrom (operation 710). The post is configured to be coupled to an end of the plurality of elongated shafts to form a roller element, such as the roller elements described herein. The roller element is configured to be rotatably supported at least partially within the substantially U-shaped channel of the plurality of roof supports.

FIGS. 13-17 are described below and illustrate further cross-sectional configurations that can be utilized for the rooftop equipment support described herein. Similar to the supports described above, a U-shaped channel forms a strut member to support the rooftop equipment thereon. However, the unitary support body can additionally or alternatively take on different shapes and configurations. In the examples, the cross-sectional profile of the body still enables extrusion manufacturing so that the support can be cut to length as required or desired.

Figure 13:
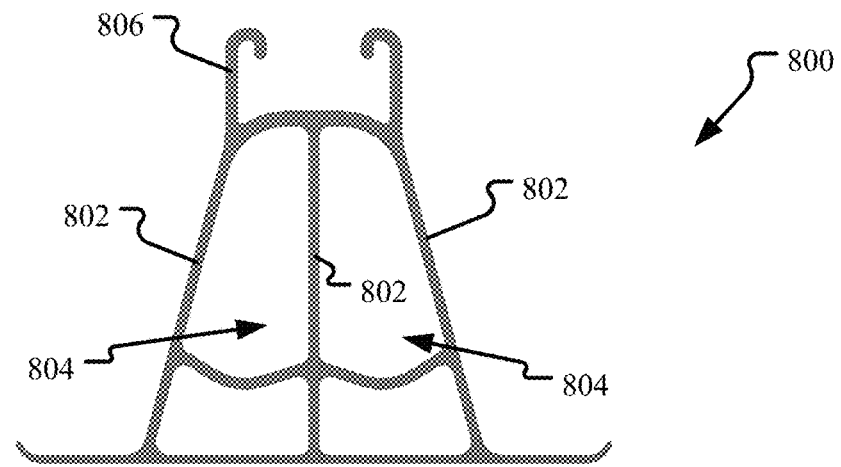
FIG. 13 is an end elevation view of another rooftop equipment support.

FIG. 13 is an end elevation view of another rooftop equipment support 800. In this example, three or more sidewalls 802 can be used. This configuration defines two or more lumens 804 below a U-shaped channel 806 that are shaped and sized to receive and support a pipe member. The lumens 804 enable two adjacent and parallel pipe members (not shown) to be supported by the support 800 and below the U-shaped channel 806.

Figure 14:
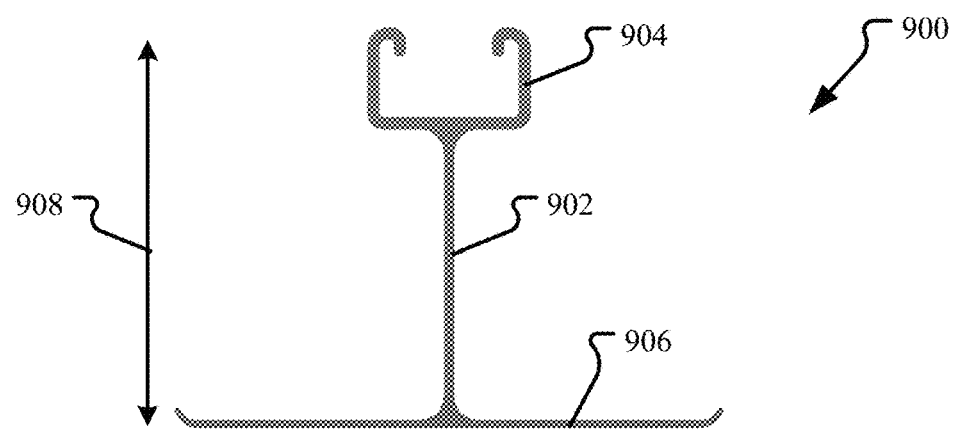
FIG. 14 is an end elevation view of another rooftop equipment support.

FIG. 14 is an end elevation view of another rooftop equipment support 900. In this example, a single sidewall 902 can be used to support a U-shaped channel 904 above a base 906. In an aspect, a height 908 of the support 900 may be between about 2-4 inches. In some examples, a thickness of the sidewall 902 can be increased compared to the base 906 and/or the U-shaped channel 904 to increase the structural strength of the support 900.

Figure 15:
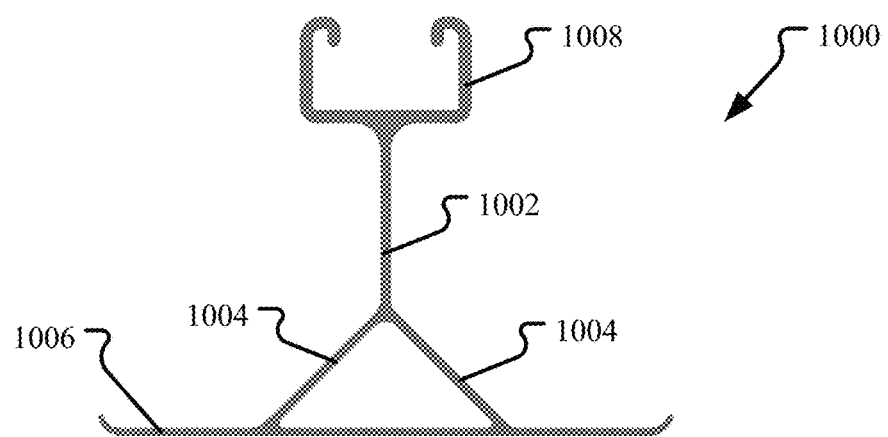
FIG. 15 is an end elevation view of another rooftop equipment support.

FIG. 15 is an end elevation view of another rooftop equipment support 1000. In this example, a sidewall 1002 includes webbing members 1004 proximate a base 1006 to increase the structural strength of the support 1000. A U-shaped channel 1008 is supported by the sidewall 1002.

Figure 16:
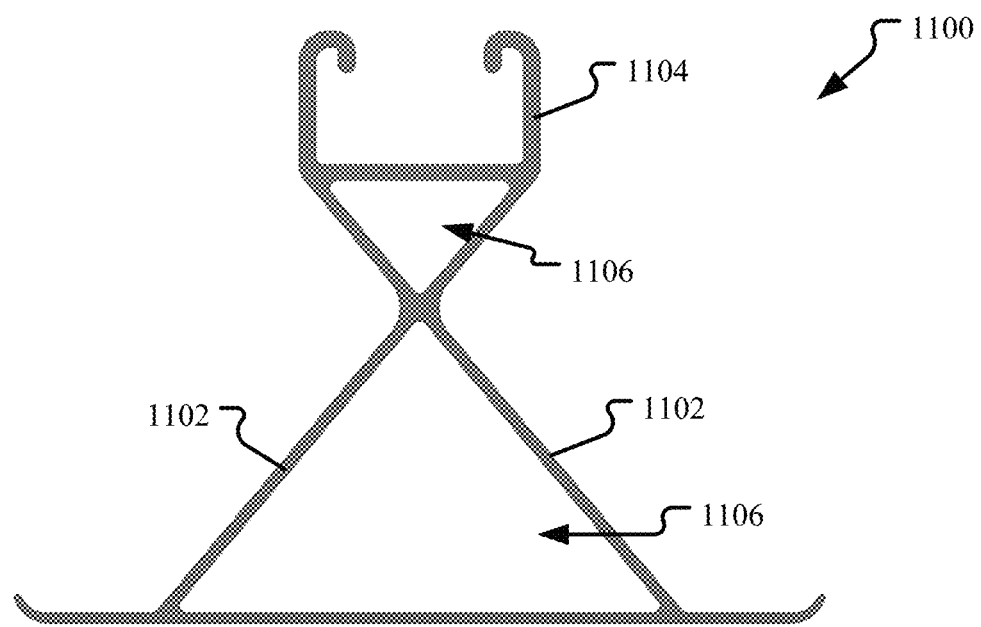
FIG. 16 is an end elevation view of another rooftop equipment support.

FIG. 16 is an end elevation view of another rooftop equipment support 1100. In this example, sidewalls 1102 are oriented in a substantial X-shape providing a brace configuration for a U-shaped channel 1104. Two lumens 1106 are also formed.

Figure 17:
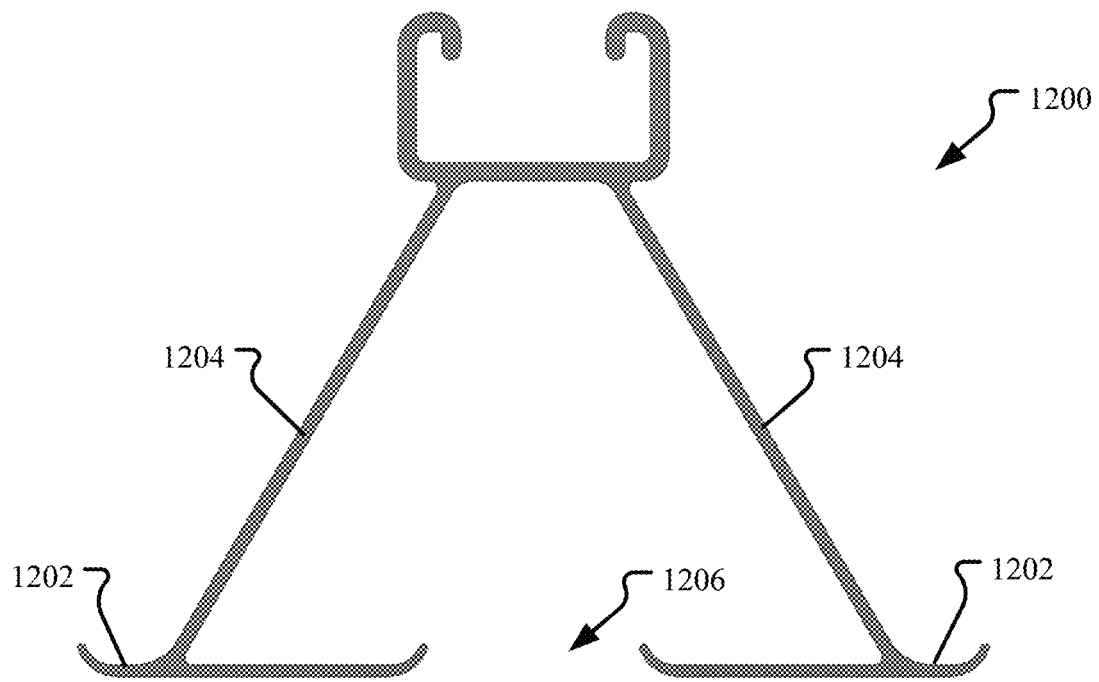
FIG. 17 is an end elevation view of another rooftop equipment support.

FIG. 17 is an end elevation view of another rooftop equipment support 1200. In this example, a base 1202 can be split into two discrete members and one for each sidewall 1204. As such, a gap 1206 is defined within the base 1202 and between the members.

The materials utilized in the supports described herein may be those typically utilized for building hardware component manufacture. Material selection for most of the components may be based on the proposed weight of the pipe and/or equipment, installation conditions, safety guidelines, etc. Appropriate materials may be selected for the supports used on particularly heavy or large pipes and equipment, as well as on pipes and equipment subject to certain environmental conditions (e.g., moisture, corrosive atmospheres, UV exposure, etc.). Aluminum, steel, stainless steel, zinc, or composite materials can be utilized.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A roof equipment support comprising:
   a platform having a length greater than a width;
   a pair of sidewalls extending from the platform;
   a top wall extending between the pair of sidewalls and offset from the platform, wherein the top wall includes a planar surface portion, wherein the platform, the pair of sidewalls, and the top wall define an interior cavity that extends the length of the platform from a first end to a second end, and wherein the cavity is open at both the first end and the second end; and
   a pair of strut extensions extending from the top wall, wherein each of the pair of strut extensions comprises a hook at a distal end, wherein each of the strut extensions has a planar portion perpendicular to the platform, and wherein the hook at the distal end of each of the strut extensions includes a 180 degree bend, wherein the pair of strut extensions and the top wall define a channel that extends the length of the platform, wherein an angle between the platform and at least one of the pair of sidewalls within the interior cavity is an acute angle, and wherein the platform, the pair of sidewalls, the top wall, and the pair of strut extensions are unitary.

2. The roof equipment support of claim 1, wherein a cross-sectional profile of the support is constant along the length of the platform.

3. The roof equipment support of claim 1, wherein the platform, the pair of sidewalls, the top wall, and the pair of strut extensions are formed from a same material in an extrusion process.

4. The roof equipment support of claim 1, wherein a cross-section of the interior cavity has a trapezoidal shape.

5. The roof equipment support of claim 1, wherein a width of the platform is greater than a spacing between the pair of sidewalls proximate the platform.

6. The roof equipment support of claim 1, wherein a width of the top wall is less than the width of the platform.

7. A roof equipment support comprising:
   a first wall having a first width and a length greater than the first width;
   a second wall having the length and a second width and spaced from the first wall, the second width less than the first width;
   a third wall extending between the first wall and the second wall, the third wall extending at an acute angle from the first wall;
   a fourth wall extending between the first wall and the second wall opposite of the third wall, the fourth wall extending at an acute angle from the first wall;
   a first strut extension extending from a connection between the third wall and the second wall, the first strut extension being orthogonal to both the first wall and the second wall, wherein a distal end of the first strut extension has a first hook;

a second strut extension extending from a connection between the fourth wall and the second wall, the second strut extension being orthogonal to both the first wall and the second wall, wherein a distal end of the second strut extension has a second hook; and a channel defined by the second wall, the first strut extension, and the second strut extension; and a roller element configured to be rotatably received at least partially between the second wall, the first strut extension, and the second strut extension, wherein the roller element comprises an elongated shaft with a diameter that is greater than a height of the first strut extension and the second strut extension above the second wall;

wherein at least the first wall, the second wall, the third wall, and the fourth wall define an interior cavity that extends a length of the first wall and the second wall from a first end to a second end, wherein the cavity is open at both the first end and the second end.

8. The roof equipment support of claim 7, further comprising one or more pads coupled to the first wall opposite the third wall and the fourth wall.

9. The roof equipment support of claim 7, wherein the first wall, the second wall, the third wall, the fourth wall, the first strut extension, and the second strut extension are all integral with one another.

10. The roof equipment support of claim 7, wherein a cross-sectional profile of the roof equipment support is an extrusion profile with a fixed cross-sectional profile between ends that define a length of the first wall.

11. The roof equipment support of claim 7, wherein the third wall and the fourth wall are all planar walls, and wherein the third wall and the fourth wall each comprises an uninterrupted outer surface between the first end and the second end.

12. The roof equipment support of claim 7, further comprising:

at least one support wall extending between the third wall and the fourth wall, wherein the at least one support wall divides the interior cavity into at least two lumens.

* * * * *